US011190850B2

(12) United States Patent
Oztaskent et al.

(10) Patent No.: US 11,190,850 B2
(45) Date of Patent: *Nov. 30, 2021

(54) METHODS, SYSTEMS, AND MEDIA FOR DETERMINING CHANNEL INFORMATION

(71) Applicant: Google LLC, Mountain View, CA (US)

(72) Inventors: Ant Oztaskent, Sutton (GB); Yaroslav Volovich, Cambridge (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,955

(22) Filed: May 6, 2019

(65) Prior Publication Data
US 2019/0261057 A1 Aug. 22, 2019

Related U.S. Application Data

(63) Continuation of application No. 15/482,439, filed on Apr. 7, 2017, now Pat. No. 10,284,919, which is a
(Continued)

(51) Int. Cl.
H04N 21/442 (2011.01)
H04N 21/482 (2011.01)
(Continued)

(52) U.S. Cl.
CPC ......... H04N 21/4821 (2013.01); H04L 65/40 (2013.01); H04N 21/2387 (2013.01);
(Continued)

(58) Field of Classification Search
CPC ....... H04N 21/25841; H04N 21/25866; H04N 21/431; H04N 21/44227; H04N 21/482
See application file for complete search history.

(56) References Cited

U.S. PATENT DOCUMENTS 6,563,430 B1 * 5/2003 Kemink ................ H04B 1/202
340/12.22
7,983,691 B1 * 7/2011 Wong ...................... H04W 4/02
455/456.1
(Continued)

OTHER PUBLICATIONS

Notice of Allowance dated Oct. 7, 2015 in U.S. Appl. No. 14/086,780.
(Continued)

Primary Examiner — Dominic D Saltarelli
(74) Attorney, Agent, or Firm — Byrne Poh LLP

(57) ABSTRACT

In accordance with some implementations of the disclosed subject matter, mechanisms for determining channel information are provided. In some implementations, a method for providing media guidance is provided, the method comprising: associating with a local area network; detecting at least one media device on the local area network; determining device information associated with the at least one media device on the local area network; determining, without user intervention, television provider information based on the device information; determining location information of the at least one media device; determining channel information based on the determined television provider information and the determined location information; and causing media guidance information to be presented that includes at least a portion of the determined channel information.

24 Claims, 5 Drawing Sheets

Related U.S. Application Data continuation of application No. 15/043,120, filed on Feb. 12, 2016, now Pat. No. 9,621,947, which is a continuation of application No. 14/086,780, filed on Nov. 21, 2013, now Pat. No. 9,264,771.

(51) Int. Cl.

| | | |
|---|---|---|
| *H04N 21/258* | (2011.01) | |
| *H04N 21/431* | (2011.01) | |
| *H04N 21/40* | (2011.01) | |
| *H04N 21/436* | (2011.01) | |
| *H04N 21/434* | (2011.01) | |
| *H04N 21/45* | (2011.01) | |
| *H04N 21/84* | (2011.01) | |
| *H04N 21/2387* | (2011.01) | |
| *H04L 29/06* | (2006.01) | |

(52) U.S. Cl.
CPC ........... *H04N 21/25841* (2013.01); *H04N 21/25866* (2013.01); *H04N 21/431* (2013.01); *H04N 21/4312* (2013.01); *H04N 21/4345* (2013.01); *H04N 21/43615* (2013.01); *H04N 21/44227* (2013.01); *H04N 21/4516* (2013.01); *H04N 21/4524* (2013.01); *H04N 21/4532* (2013.01); *H04N 21/482* (2013.01); *H04N 21/4826* (2013.01); *H04N 21/84* (2013.01)

(56) References Cited

U.S. PATENT DOCUMENTS

| | | | |
|---|---|---|---|
| 8,266,648 | B2 | 9/2012 | Olague et al. |
| 8,528,020 | B2 | 9/2013 | DeLaCruz et al. |
| 8,862,155 | B2 | 10/2014 | Stern et al. |
| 2003/0070170 | A1 | 4/2003 | Lennon et al. |
| 2014/0259078 | A1* | 9/2014 | Arling ............... H04N 21/4524 725/56 |

OTHER PUBLICATIONS

Notice of Allowance dated Nov. 29, 2016 in U.S. Appl. No. 15/043,120.
Notice of Allowance dated Dec. 20, 2018 in U.S. Appl. No. 15/482,439.
Office Action dated Jan. 16, 2018 in U.S. Appl. No. 15/482,439.
Office Action dated May 10, 2018 in U.S. Appl. No. 15/482,439.
Office Action dated May 28, 2015 in U.S. Appl. No. 14/086,780.
Office Action dated Aug. 29, 2018 in U.S. Appl. No. 15/482,439.
Universal Plug N Play Forum, "UPnP Device Architecture Version 1.1", Technical Report, Oct. 15, 2008, pp. 1-136.

* cited by examiner

METHODS, SYSTEMS, AND MEDIA FOR DETERMINING CHANNEL INFORMATION

CROSS-REFERENCE TO RELATED APPLICATIONS

This application is a continuation of U.S. patent application Ser. No. 15/482,439, filed Apr. 7, 2017, which is a continuation of U.S. patent application Ser. No. 15/043,120, filed Feb. 12, 2016, which is a continuation of U.S. patent application Ser. No. 14/086,780, filed Nov. 21, 2013, each of which is hereby incorporated by reference herein in its entirety.

TECHNICAL FIELD

The disclosed subject matter relates to methods, systems, and media for determining channel information.

BACKGROUND

There is an overwhelming volume of media content that is available to the average consumer. More particularly, there are many applications that a consumer can use on a television or set-top box that allow the consumer to consume media content from various sources. For example, a consumer can select between media content that is delivered linearly from a multichannel video programming distributor, video-on-demand content that is provided by a multichannel video programming distributor, personal media content that is acquired by the consumer, recorded content that is stored on a digital video recorder or any other suitable storage device, and/or on-demand content that is provided from over-the-top providers.

As the number of sources continues to increase (e.g., additional over-the-top providers of on-demand content), media guidance becomes increasingly important. For example, the consumer can review program guide information, such as a grid guide of program listings organized by channel, prior to making a decision on which media content to view. However, television channels that are available to the consumer and their channel number allocations can vary widely throughout the country. In order to receive such media guidance, the consumer is generally required to manually input a zip code, a city, a state, and/or other location information and then select a service provider for the inputted location. This can be cumbersome for the user and can detract from the consumer's experience in using a device to obtain media guidance.

Accordingly, mechanisms for determining channel information are desirable.

SUMMARY

In accordance with various implementations of the disclosed subject matter, mechanisms for determining channel information are provided.

In some implementations, a method for providing media guidance is provided, the method comprising: associating with a local area network; detecting at least one media device on the local area network; determining device information associated with the at least one media device on the local area network; determining, without user intervention, television provider information based on the device information; determining location information of the at least one media device; determining channel information based on the determined television provider information and the determined location information; and causing media guidance information to be presented that includes at least a portion of the determined channel information.

In some implementations, a system for providing media guidance is provided, the system comprising a hardware processor that is configured to: associate with a local area network; detect at least one media device on the local area network; determine device information associated with the at least one media device on the local area network; determine, without user intervention, television provider information based on the device information; determine location information of the at least one media device; determine channel information based on the determined television provider information and the determined location information; and cause media guidance information to be presented that includes at least a portion of the determined channel information.

In some implementations, a non-transitory computer-readable medium containing computer-executable instructions that, when executed by a processor, cause the processor to perform a method for providing media guidance is provided. The method comprising: associating with a local area network; detecting at least one media device on the local area network; determining device information associated with the at least one media device on the local area network; determining, without user intervention, television provider information based on the device information; determining location information of the at least one media device; determining channel information based on the determined television provider information and the determined location information; and causing media guidance information to be presented that includes at least a portion of the determined channel information.

In some implementations, a system for providing media guidance is provided, the system comprising: means for associating with a local area network; means for detecting at least one media device on the local area network; means for determining device information associated with the at least one media device on the local area network; means for determining, without user intervention, television provider information based on the device information; means for determining location information of the at least one media device; means for determining channel information based on the determined television provider information and the determined location information; and means for causing media guidance information to be presented that includes at least a portion of the determined channel information.

In some implementations, the system further comprises: means for performing a search on the local area network for device information for the at least one media device detected on the local area network; means for receiving the device information in response to the search from the at least one media device; means for transmitting a query that includes at least a portion of the received device information to a remote server that hosts a television provider database; and means for receiving the television provider information in response to transmitting the query to the remote server.

In some implementations, the determined channel information includes a channel lineup corresponding to the determined television provider information and the determined location information and the media guidance information includes an electronic program guide that includes a plurality of media content listings organized by a plurality of allocated channel numbers that are derived from the channel lineup.

In some implementations, the media guidance information includes a media content recommendation that includes a channel number from the determined channel information.

In some implementations, the system further comprises transmitting the determined channel information to the at least one media device on the local area network.

In some implementations, the system further comprises causing the media guidance information that includes at least a portion of the determined channel information to be presented on the at least one media device.

In some implementations, the system further comprises transmitting device configuration information to the at least one media device that includes at least a portion of the determined channel information.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
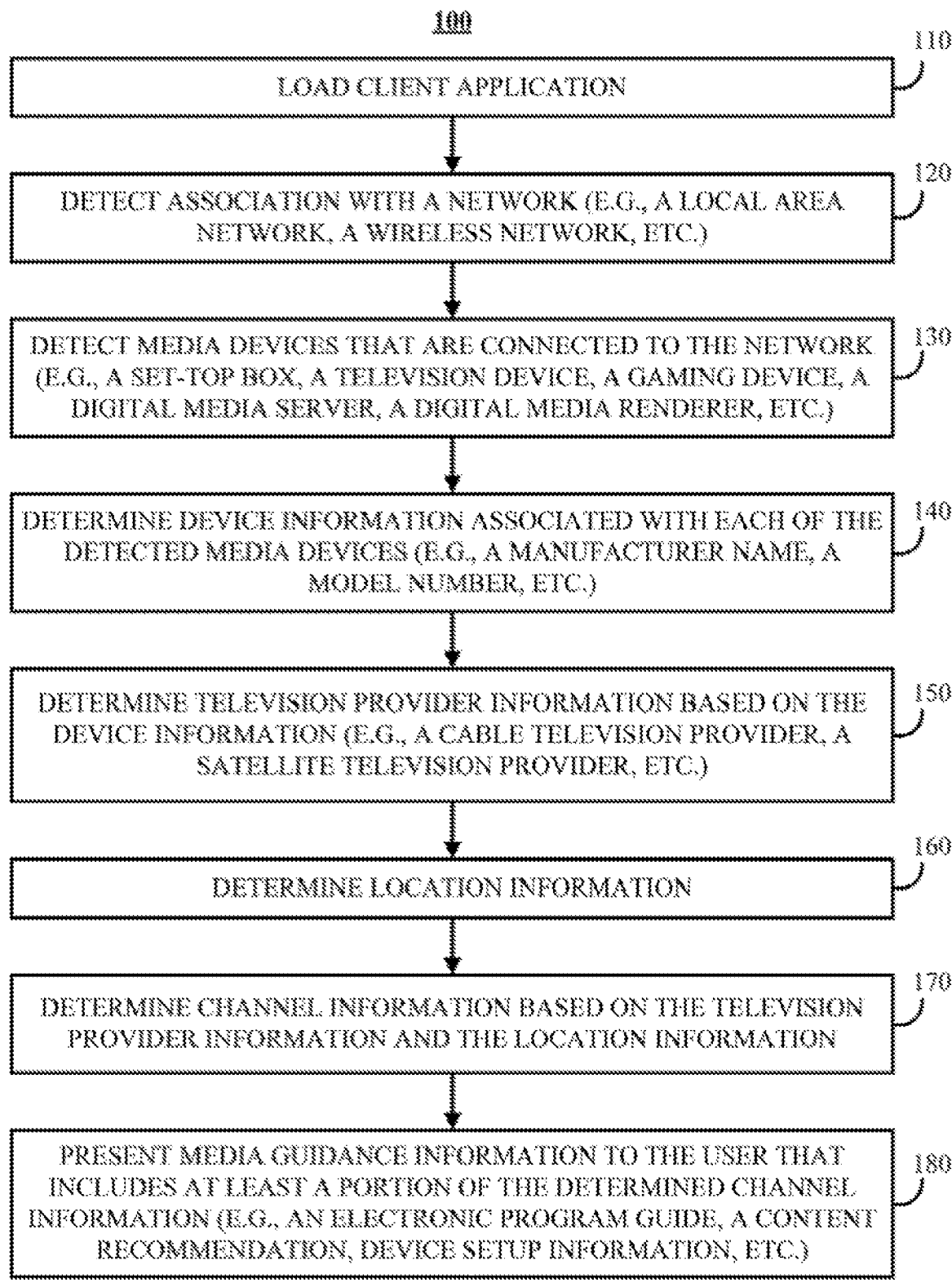
FIG. 1 shows an illustrative example of a process for determining channel information and presenting media guidance information that includes the determined channel information in accordance with some implementations of the disclosed subject matter.

In accordance with some implementations of the disclosed subject matter, mechanisms for determining channel information are provided. More particularly, these mechanisms can determine television provider information and/or location information to determine channel information. Channel information can include, for example, a channel lineup with allocated channel numbers and channel identifiers.

In some implementations, these mechanisms can determine television provider information by detecting media devices that are connected to a network and, for the detected media devices, determine associated device information. For example, the mechanisms can detect that a particular digital media server is connected to a local network associated with a user's home and determine a manufacturer name and a model number associated with that particular digital media server.

In a more particular example, a client application implementing the mechanisms described herein can be loaded on a mobile device. Upon detecting that the mobile device has associated with a network, such as a user's wireless local network having multiple networked media devices, the mobile device can detect the media devices that are connected to the network and, for the detected media devices, determine associated device information.

In another more particular example, a client application implementing the mechanisms described herein can be loaded on a media device, such as a television device or a gaming device. Upon connecting the media device to the network, such as a user's local network during setup of the media device, the media device can detect other media devices that are connected to the network and, for the detected media devices, determine associated device information.

In these examples, the mechanisms can use the manufacturer name, the model number, and other suitable device information to determine a particular television provider. Upon determining a particular television provider and/or location information associated with one or more media devices, the mechanisms can present the user with media guidance information that includes at least a portion of the determined channel information. For example, the mechanisms can present the user with an electronic program guide application that includes media content information organized by a channel lineup of channel numbers and channel identifiers corresponding to the user's television provider. In another example, the mechanisms can present the user with content recommendations that include channel numbers corresponding to the user's television provider. In yet another example, the mechanisms can then be used configure one or more media device with television provider information, channel information, location information, etc.

These mechanisms described herein can be used in various applications. For example, these mechanisms can be used to determine, without user intervention, television provider information and location information so that channel information can be determined. For mobile devices, the channel information can be incorporated into mobile device applications, such as electronic program guide applications and recommendation applications. For media devices, the channel information can be incorporated into media device applications. In addition, the channel devices can be used to configure media devices, such as smart television devices, user input interfaces, etc.

These and other features for determining channel information are described herein in connection with FIGS. 1-5.

Turning to FIG. 1, an illustrative example 100 of a process for providing media guidance information based on determined channel information is shown in accordance with some implementations of the disclosed subject matter. At 110, a computing device can load a client application that can determine channel information, where the channel information can be used to provide media guidance information.

It should be noted that the computing device can be any computing device suitable for providing media guidance information based on determined channel information, such as a cellular telephone, a smartphone, a tablet computing device, a wearable computing device, a heads-up display, a laptop computer, a personal computer (PC), a smart television, a gaming device, a gaming device, a set-top box, etc. For example, the client application can be loaded on a mobile device, where the mobile device determines channel information and/or presents media guidance information based on the channel information. In another example, the client application can be loaded on a television device, where the television device determines channel information and/or presents media guidance information based on the channel information. In yet another example, the client application can be loaded on multiple devices, where a mobile device executing the client application determines the channel information and where a television device executing the client application presents media guidance information.

It should be noted that channel information can include, for example, channel identifiers, channel numbers, a channel lineup include one or more channels, a channel lineup including all available channels, etc. For example, channel information can include a channel lineup with channel number allocations corresponding to a particular television provider. In another example, channel information can include a particular channel number corresponding to a particular television provider.

At 120, process 100 can detect an association or connection with a local network (e.g., a local area network, a wireless local area network, a wired/wireless local area network, or any other suitable local network). For example, in some implementations where the computing device is a mobile device, the mobile device can connect with a wireless local area network having multiple networked media devices. In a more particular example, the client application executing on the mobile device can detect that the mobile device is associated with a particular local network, such as a user's home network. In this example, the mobile device can indicate to the client application that the mobile device is connected to a particular local network, such as a service set identifier (SSID) that a user has designated as a wireless network in the user's home. In some implementations, the mobile device can designate a particular network as a home network based on number of associations (e.g., a local network that is most frequently associated by the mobile device, a local network that includes particular media devices that is most frequently associated by the mobile device, etc.).

Additionally or alternatively, in implementations where the computing device is a television device or any other suitable media playback device, the television device can be connected to a local network having multiple networked media devices. For example, the television device can be connected via a wired connection to a networking device. In another example, the television can be connected to a wireless network in response to providing network information, such as a service set identifier and/or a password.

At 130, in response to detecting a connection with the local network, process 100 can detect media devices that are connected to the local network. For example, in response to initiating the client application on a computing device, the computing device can detect whether one or more set-top boxes, television devices, gaming devices, digital media server (DMS) devices, digital media renderer (DMR) devices, digital media players (DMP), and/or any other suitable media devices are connected to the local network. In another example, in response to initiating the client application on a computing device, the computing device can detect whether particular types of media devices, such as set-top boxes and television devices, are connected to the local network.

In a more particular implementation, process 100 can initiate media device discovery in response to receiving an instruction from the computing device executing process 100 to initiate device discovery on the network to which the computing device is connected. When the computing device is a mobile device, process 100 can be initiated by the mobile device at any suitable time and for any suitable reason or reasons. For example, the client application running on the mobile device can initiate process 100 to determine whether the mobile device is one the same network as a digital media device, such as a digital media server or a digital media renderer.

In some implementations, process 100 can check a cache of previously discovered media devices associated with the current network. For example, each time process 100 is executed by the client application for a particular network, process 100 can store information relating to media devices discovered on that particular network in a cache.

At 140, upon detecting that presence of media devices on the network, process 100 can determine device information associated with each of the detected media devices. For example, process 100 can determine device details, such as a device identification number (e.g., a Universal Unique Identifier (UUID)), an address of the device on the network, a location where additional device details can be found, a manufacturer name of the device, a text string including a name of the device, a text string include a model number of the device, a text string include a description of the device, or any other suitable device information.

In a more particular implementation, process 100 can execute a full discovery protocol on the network for determining the details of any media devices found on the current network. The full discovery protocol can include transmitting a multicast message to all devices on the network requesting device details from the devices on the network. Additionally, the multicast message can be addressed to certain types of devices and/or can be compatible with a discovery protocol for devices that comply with a particular standard (e.g., Universal Plug and Play (UPnP), Digital Living Network Alliance (DLNA), etc.). In some implementations, process 100 can wait a predetermined amount of time for responses to the multicast message, which can be in the form of a unicast message addressed to the computing device executing process 100. Such a unicast message can include one or more device details or device information.

Additionally, in some implementations, the full discovery protocol can include requesting additional device details from media devices that responded by sending a unicast message to an address and/or location included in a reply by the device to the multicast message. Such additional details can include a name of the device (e.g., a text name of the device if a name has been assigned to the device), a manufacturer of the device, a model name of the device, a model number of the device, a model description of the device, a serial number of the device, and/or any other suitable device information associated with the device.

In some implementations, a device type or device category (e.g., television, game console, set-top box, etc.) and/or description of the media device's capabilities can be included in the response to the message sent by process 100 using the computing device executing process 100. Alternatively, the device type and/or the description of the device's capabilities may not be included in any reply.

In another more particular implementation, the full discovery protocol can cause the computing device executing process 100 to send a User Datagram Protocol (UDP) multicast message on the current network. In some implementations, the UDP can include an M-Search message directed to media devices, such as digital media renderers and/or digital media servers (e.g., as defined in DLNA Guidelines, December 2011, Part 1: Architecture and Protocols" technical specification, which is hereby incorporated by reference herein in its entirety), digital media players, or any other suitable media device that outputs, processes, and/or presents media content. In some implementations, the UDP multicast message can include an address of the device sending the message (e.g., the network address of the computing device executing process 100), and can include a time period during which replies are to be sent. Such a time period can be any suitable time period, such as one second, two seconds, etc., and can be set based on any suitable factors. An example of simple device discovery protocol (SSDP) is described in "UPnP™ Device Architecture 1.1" technical specification as revised Oct. 15, 2008, which is hereby incorporated by reference herein in its entirety. In some implementations, SSDP as used herein can be a modified form of SSDP and may add elements and/or omit elements as compared to SSDP as described in "UPnP™ Device Architecture 1.1".

In response to receiving UDP unicast replies from media devices on the network, process 100 can extract device details associated with a particular media device included in the UDP unicast reply. For example, a UUID for the replying media device and a uniform resource locator (URL) at which additional device details or device information can be found can be extracted from the UDP unicast reply. Such a URL can specify a suitable address at which the additional device information can be found, such as an address of the responding media device, an address of a remote server, or any other suitable location. In a more particular example, a Device Description file of the responding device can be located at the URL and can include additional device information, such as a name of the device, an identification of the manufacturer of the device, a model name of the device, a model number of the device, a device type of the device, and/or any other suitable device details. It should be noted that the Device Description file can be in any suitable format, such as Extensible Markup Language (XML), HyperText Markup Language (HTML), as a text file, or using any other suitable format.

In some implementations, the Device Description file can include various fields that identify a particular type of information as corresponding to particular device details. For example, the Device Description file can include the following fields: <manufacturer>, which can include a name of the manufacturer of the device; <model_name>, which can include a manufacturer assigned model name of the device; <model_number>, which can include a manufacturer assigned model number, <model_description>, which can include a longer description of the device (e.g., less than 128 characters); <X_device_category>, which can indicate a device type if present; and/or any other suitable fields. In some implementations, such fields can be formatted using any suitable formatting. For example, these fields can be formatted to comply with the UPnP standard described above.

It should be noted that, although the implementations described herein mention the use of the SSDP protocol for device discovery, this is merely illustrative. Any other suitable device discovery protocol can be used to detect the presence of media devices, such as the multicast Domain Name System (mDNS) and DNS-based Service Discovery (multicast DNS/DNS-SD) protocol and the DIscovery And Launch (DIAL) protocol. For example, the DIAL service discovery protocol is based on the SSDP protocol and can discover devices on a local area network, such as television devices, and can launch an application on the television device to display content.

Referring back to FIG. 1, at 150, process 100 can determine television provider information based on the device information, such as a particular cable television provider, a particular satellite television provider, a particular telecommunication television provider, a particular streaming media provider, and/or any other suitable media provider. For example, process 100 can transmit a query to a device identification database for a television provider associated with the detected media device. Such a query can include any suitable device details or device information to determine a television provider associated with the media device. For example, process 100 can generate the query to include information about the manufacturer of the device, a model name of the device, a model description of the device, and a model number of the device. In this example, the query can be transmitted to a database that includes set-top box device information used by particular cable and satellite television providers. In response, the database can return a response that indicates the service provider associated with the detected media device.

Additionally or alternatively, process 100 can transmit a query to a search system for a television provider associated with the detected media device. For example, the response received from the database can indicate that the television provider of the responding device is unknown and/or cannot be determined by the database. In response, process 100 can transmit any suitable device details and/or device information for input into the search system. The search system can, for example, input device details and/or device information as keywords and determine, from the search results, a television provider associated with the detected media device.

In some implementations, the search system can determine whether a match is found. If no matching television provider is found, process 100 can wait to receive additional device details or device information. Additionally or alternatively, process 100 can transmit a message to the client application requesting that the user restart the client application, transmit other device information, and/or input or verify particular information.

In some implementations, process 100 can determine location information associated with the detected media device at 160. As described above, location information can be included in device details obtained from the detected media device. In another example, location information can be determined from the computing device. When the computing device is a mobile device, process 100 can determine location information from a user profile, user preferences, search history, etc. For example, process 100 can determine from a user account associated with the mobile device includes a location that the user has designated as a home location. In another example, process 100 can determine from email information and/or search history information (e.g., associated with a user account on the mobile device) an approximate location of the media device. In some implementations, the location information determined from the mobile device can include coordinates such as coordinates derived using the Global Positioning System (GPS), and/or approximate coordinates such as coordinates derived using multilateration techniques (e.g., triangulation of radio signals from a known radio source, such as a wireless base station), or the like.

In situations in which the mechanisms described herein collect personal information about users, or can make use of personal information, the users can be provided with an opportunity to control whether programs or features collect user information (e.g., information about cached device details on a user's media device, devices discovered on networks to which the user device is connected, an address from which a database query is sent, a user's preferences, or a user's current location), or to control whether and/or how to receive content from the server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

Referring back to FIG. 1, in some implementations, process 100 can determine channel information based on the television provider information and the location information at 170. For example, process 100 can determine channel information, such as a television channel lineup, a network-to-channel mapping or a source-to-channel mapping, or a particular channel number for a television network, by transmitting a query to a database of media information, such as a Tribune Media Services (TMS) database, that includes the television provider information and the location information. In response, the media database can transmit a response that includes channel information for use by the client application executing on the computing device.

It should be noted that the channel information can be stored in any suitable storage device. For example, the channel information can be stored on the mobile device executing process 100. In another example, the mobile device executing process 100 can transmit the channel information to a connected media device, such as a connected television device on the local network, for storage.

At 180, process 100 can present media guidance information to the user that includes at least a portion of the determined channel information. For example, the mobile device executing process 100 can present an electronic program guide on the display of the mobile device that includes the channel information corresponding to the determined television provider along with media content information (e.g., the user can watch television show A at 5:00 PM on channel 502 with the channel call sign XYZ). In another example, the mobile device executing process 100 can transmit the channel information for use by another application or another device, such as an electronic program guide application installed on the mobile device or an electronic program guide application installed on a connected television device. In yet another example, media guidance information can include content recommendations that include channel numbers or any other suitable channel information corresponding to the determined television provider (e.g., a recommendation window indicating that the user may like television show B at 7:30 PM on channel 504 with the channel call sign ZYX). In a further example, media guidance information can include device setup information, where channel information and/or television provider information can be transmitted to a connected television device or other suitable media device for configuring the device (e.g., program guide information, remote control information, channel lineup information, etc.).

It should be noted that the above steps of the flow diagram of FIG. 1 can be executed or performed in any order or sequence not limited to the order and sequence shown and described in the figure. Also, some of the above steps of the flow diagram of FIG. 1 can be executed or performed substantially simultaneously where appropriate or in parallel to reduce latency and processing times. Furthermore, it should be noted that FIG. 1 is provided as examples only. At least some of the steps shown in these figures may be performed in a different order than represented, performed concurrently, or altogether omitted.

Figure 2:
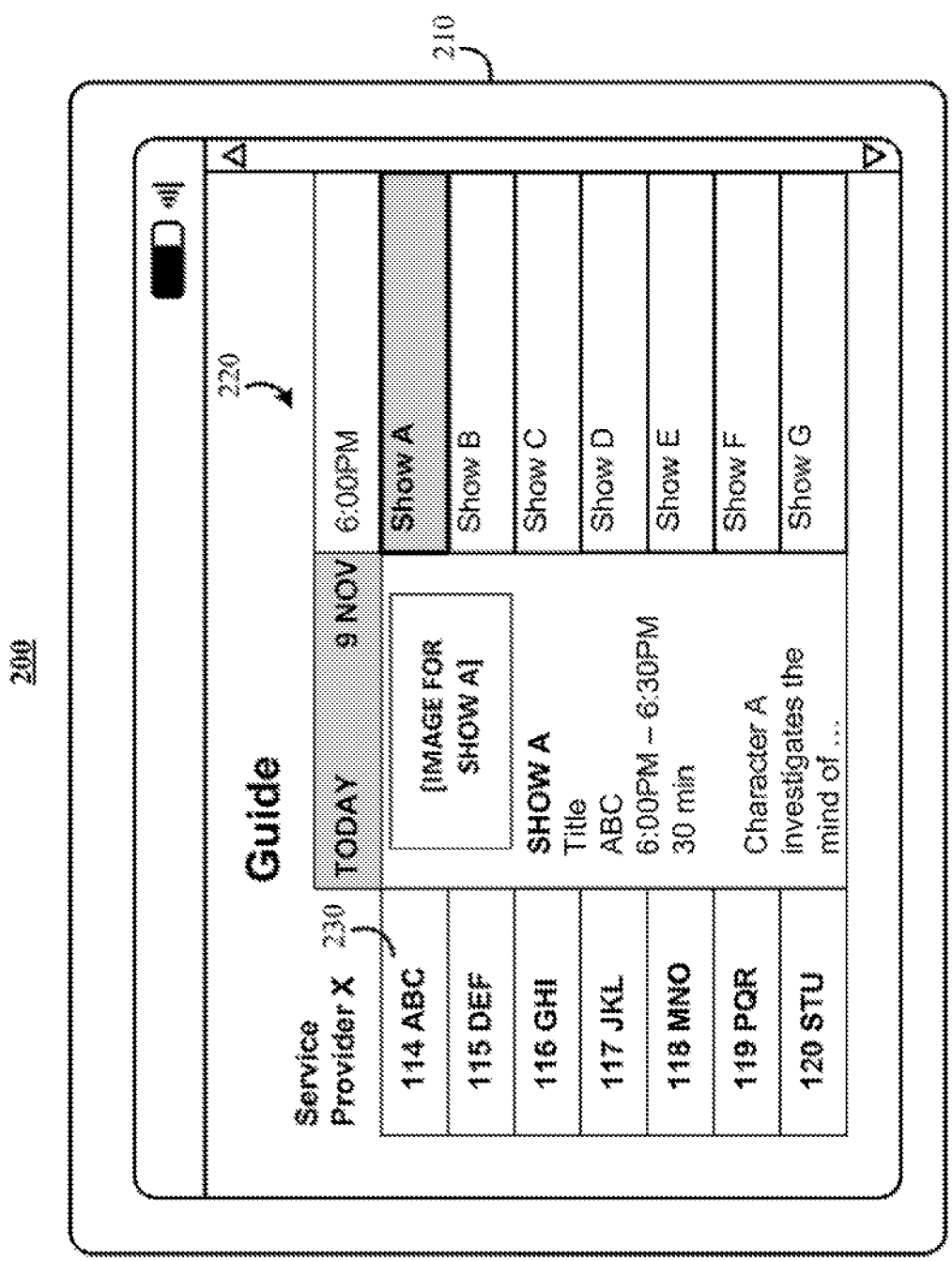
FIG. 2 shows an illustrative example of a computing device that is providing media guidance information that includes the determined channel information in the form of an electronic program guide in accordance with some implementations of the disclosed subject matter.
Figure 3:
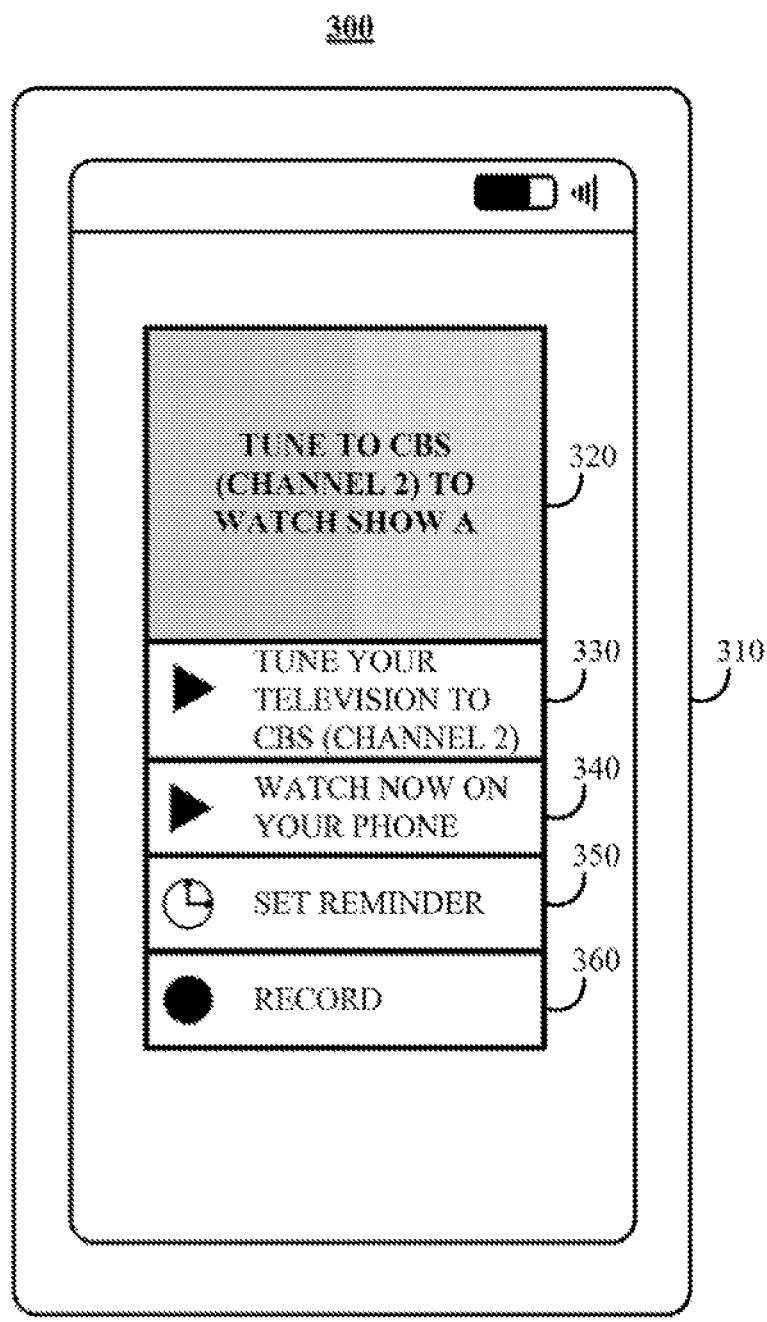
FIG. 3 shows an illustrative example of a computing device that is providing media guidance information that includes the determined channel information in the form of a content recommendation in accordance with some implementations of the disclosed subject matter.

Illustrative examples of media guidance information that can be presented on a computing device that includes the determined channel information are shown in FIGS. 2 and 3.

FIG. 2 shows an illustrative example of a mobile device displaying an electronic program guide in accordance with some implementations of the disclosed subject matter. Although any suitable device (e.g., as described below in connection with FIG. 4) can present media guidance information to the user that includes channel information, the following examples are described in connection with a mobile device, such as a smartphone, a tablet computing device, a wearable computing device, etc.

As shown in FIG. 2, in response to determining channel information, mobile device 210 can present electronic program guide 220 on the display of mobile device 210. Electronic program guide 220 can provide a program listings grid that includes channel information, such as channel numbers and channel identifiers assigned or allocated by the television provider, and includes content listings. Alternatively, electronic program guide 220 can provide media content listings to be presented in a list of search results responsive to a search query inputted by the user, where the media content listings include the channel numbers and/or any other suitable channel information corresponding to the television provider.

As described herein, the computing device, such as a second screen device, can be connected to a television device or a media device that is causing media content to be presented on the television device, such as a set-top box or a digital media receiver. In this implementation, the computing device can transmit the channel information to the connected media device, where the connected media device can cause an electronic program guide or any other suitable guidance information that includes the channel information associated with the television provider to be presented.

It should also be noted that, in some implementations, the channel information, such as a network-to-channel number mapping, can be used to update default channel information associated with an application, such as a program guide application or a recommendation application.

FIG. 3 shows an illustrative example of a mobile device displaying a content recommendation in accordance with some implementations of the disclosed subject matter. For example, the client application executing on the mobile device 310 can determine the channel information based on the television provider and/or the location information and can include the channel information in one or more media content recommendations 320 provided to the user. As shown in FIG. 3, media content recommendation 320 includes the determined channel information within the recommendation itself. For example, media content recommendation 320 can be a recommendation window or indicator that prompts the user of the computing device to tune to a particular channel in order to watch a particular television program.

As also shown in FIG. 3, options 330-360 that are provided to the user can also incorporate the determined channel information. For example, option 330 can transmit an instruction to a connected television device to tune to a particular channel in order to watch the particular television program recommended in recommendation indicator 320. In another example, option 340 can direct mobile device 310 to initiate a particular media application installed on mobile device 310 that corresponds to the particular channel so that the user can watch the particular television program recommended in recommendation indicator 320 (e.g., launch an application corresponding to the channel, launch a media playback application that has a page corresponding to the channel, etc.). In yet another example, options 350 and 360 can instruct one or more media devices to remind or record the particular television program recommended in recommendation indicator 320 by tuning to the appropriate channel corresponding to the determined television provider.

It should be noted that, in some implementations, media guidance information, such as program guide listings and content recommendations, can be provided by any suitable application or any suitable source. The channel information that is determined based on television provider information and/or location information can be used to modify the media guidance information that is provided to the user. For example, without receiving any input from the user, channel information associated with the user's television service provider can be included in one or more applications on the mobile device and/or one or more applications on media devices connected to the mobile device on a local network.

Figure 4:
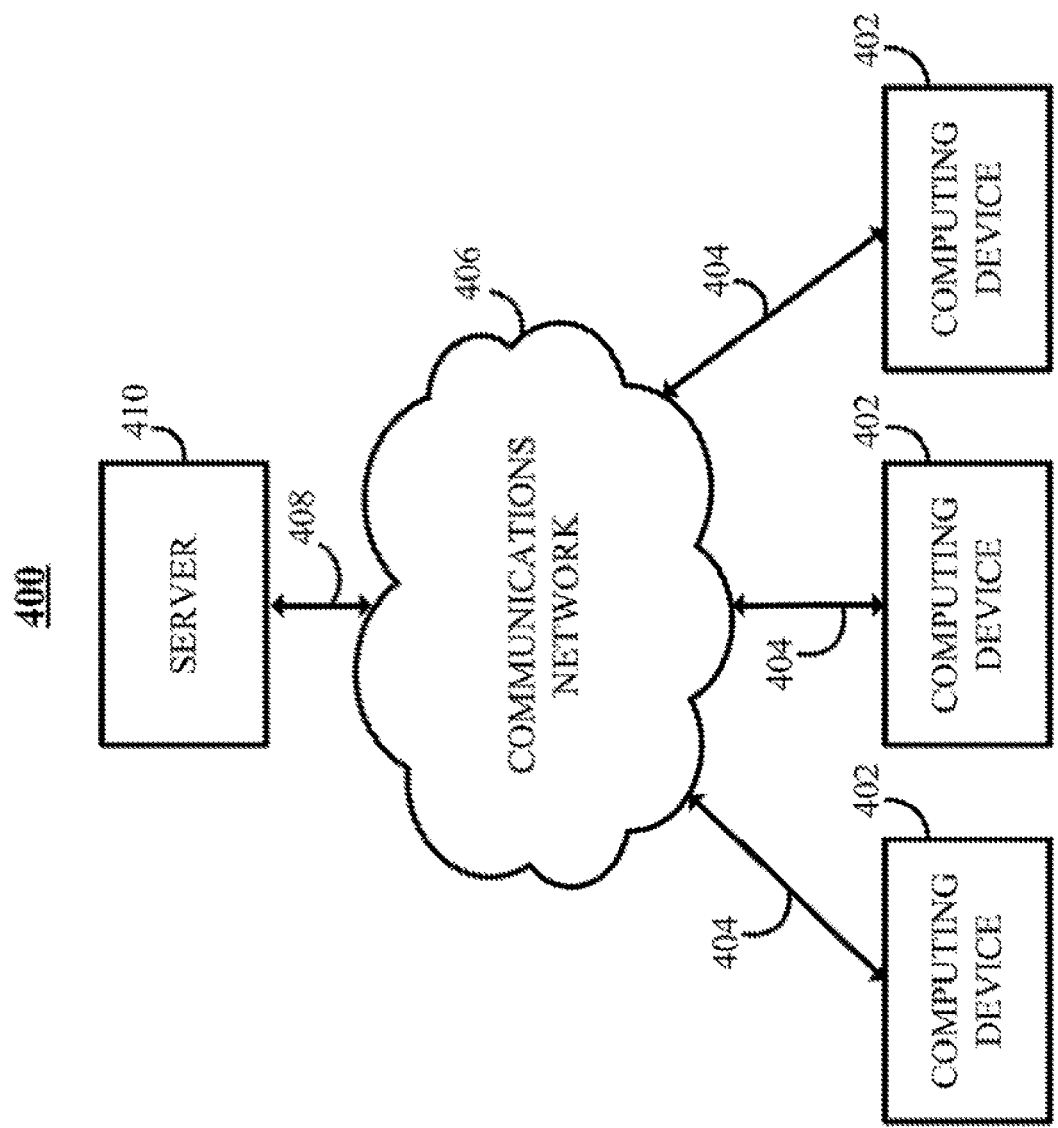
FIG. 4 shows a schematic diagram of an illustrative system suitable for implementation of the mechanisms described herein for determining channel information and providing media guidance information in accordance with some implementations of the disclosed subject matter.

FIG. 4 shows a generalized schematic diagram of a system 400 on which process 100 for determining channel information and presenting media guidance information with the channel information can be implemented in accordance with some implementations of the disclosed subject matter. As illustrated, system 400 can include one or more computing devices 402, such as a digital media device, a mobile device, a tablet computing device, a wearable computing device, and/or any suitable device for determining channel information and presenting media guidance information with the channel information. For example, system 400 can include multiple computing devices that are connected on a local network, such as a mobile device (e.g., a cellular telephone, a smartphone, a tablet computing device, a wearable computing device, a heads-up display, a laptop computer, etc.) and a media device (e.g., a set-top box, a television device, a smart television device, a gaming device, a digital media server device, a digital media renderer device, a digital media player device, etc.).

In some implementations, computing device 402 can include a storage device, such as a hard drive, a digital video recorder, a solid state storage device, a gaming console, a removable storage device, or any other suitable device for storing channel information, guidance information, device details, location information, etc.

In some implementations, computing device 402 can include a second screen device. For example, the second screen device can determine channel information and transmit the channel information to a connected media device, where the media device incorporates the channel information into media guidance information that is presented to the user.

Computing devices 402 can be local to each other or remote from each other. For example, when one computing device 402 is a television device and another computing device 402 is a second screen device (e.g., a tablet computing device, a mobile telephone, etc.), the computing devices 402 may be located in the same room and may be connected to the same local network. Computing devices 402 are connected by one or more communications links 404 to a communications network 406 that is linked via a communications link 408 to a server 410.

System 400 can include one or more servers 412. Server 412 can be any suitable server for providing access to the mechanisms described herein, such as a processor, a computer, a data processing device, or a combination of such devices. For example, the client application can be distributed into multiple backend components and multiple frontend components or interfaces. In a more particular example, backend components, such as data distribution can be performed on one or more servers 412. Similarly, the graphical user interfaces displayed by the client application, such as the graphical user interface for displaying media guidance information, can be distributed by one or more servers 412 to media playback device 402 or mobile device 402 via communication link 402.

More particularly, for example, each of the computing devices 402 and server 410 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, computing device 402 can be implemented as a personal computer, a tablet computing device, a personal digital assistant (PDA), a portable email device, a multimedia terminal, a mobile telephone, a gaming device, a set-top box, a television, etc.

Referring back to FIG. 4, communications network 406 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. For example, a mobile device 402 and a media device 402 can be connected to a local network 406. Communications links 404 and 408 may be any communications links suitable for communicating data between computing devices 402 and server 410, such as network links, dial-up links, wireless links, hard-wired links, any other suitable communications links, or a combination of such links. Computing devices 402 enable a user to access features of the application. Computing devices 402 and server 410 may be located at any suitable location. In one implementation, computing devices 402 and server 410 may be located within an organization. Alternatively, computing devices 402 and server 410 may be distributed between multiple organizations.

Figure 5:
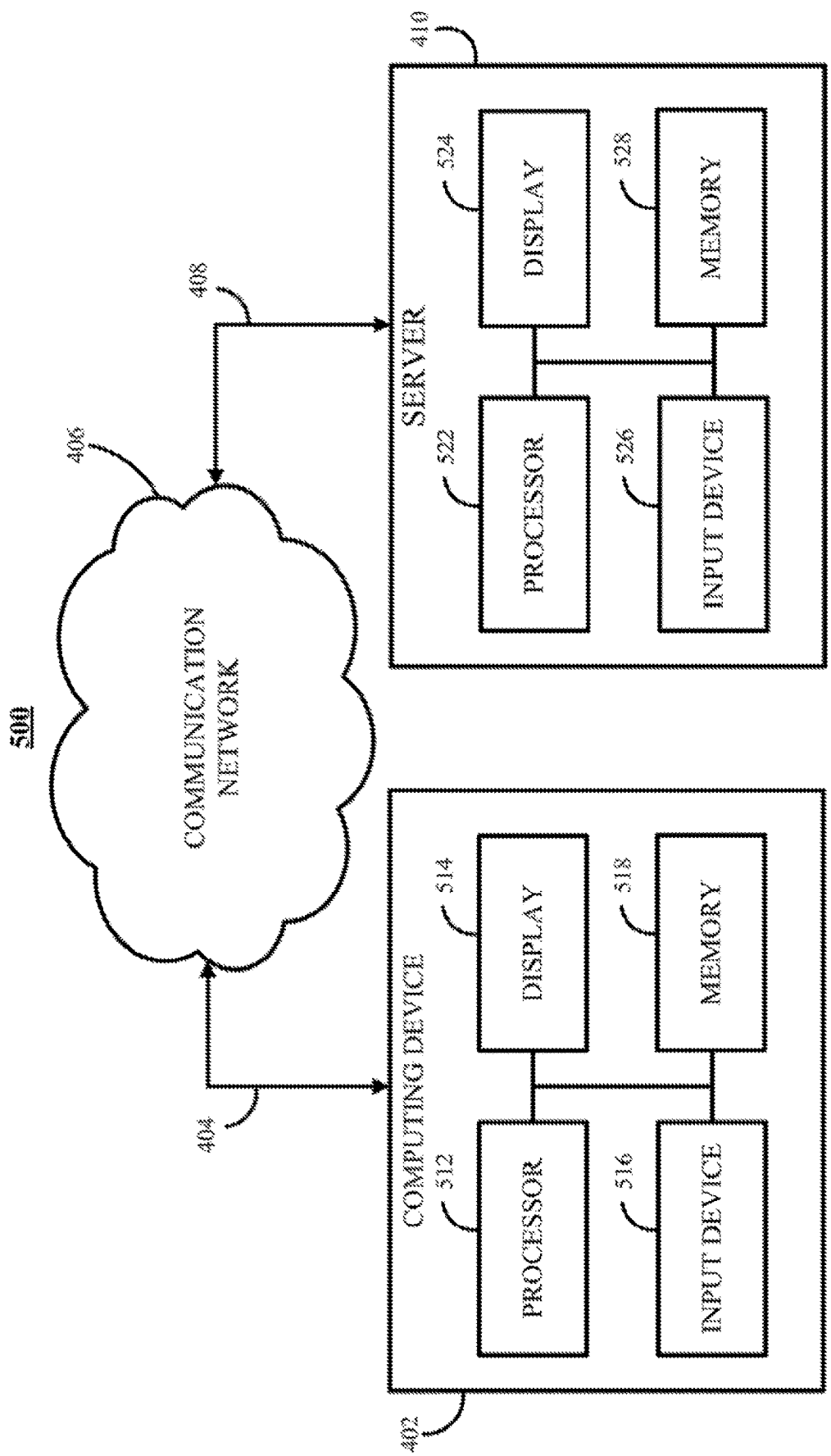
FIG. 5 shows a detailed example of a server and one of the computing devices of FIG. 4 that can be used in accordance with some implementations of the disclosed subject matter.

FIG. 5 shows and example 500 of hardware that can be used to implement server 410 and mobile device 402 depicted in FIG. 4 in accordance with some implementations. Referring back to FIG. 4, the server and one of the computing devices depicted in FIG. 4 are illustrated in more detail in FIG. 5. Referring to FIG. 5, computing device 402 may include processor 512, display 514, input device 516, and memory 518, which may be interconnected. In a preferred implementation, memory 518 contains a storage device for storing a computer program for controlling processor 512.

Processor 512 can use the computer program to present on display 514 the client application, the media guidance information including the channel information associated with the television provider, and any other suitable data received through communications link 402 and commands and values transmitted by a user of computing device 402. It should be noted that data received through communications link 404 or any other communications links can be received from any suitable source. Input device 516 can include a computer keyboard, a mouse, a trackball, a keypad, a remote control, any other suitable input device, or any suitable combination thereof. Additionally or alternatively, input device 516 can include a touch screen display 514 that can receive input (e.g. using a finger, a stylus, or the like). For example, a content recommendation and one or more user actions can be displayed on the touch screen of the mobile device and the client application executing on the mobile device can respond to contact with the touch screen, such as one or more taps on the touch screen, maintaining continuous contact with the touch screen, movement of the point of contact while maintaining continuous contact, a breaking of the contact, or any combination thereof.

Server 410 can include a processor 522, a display 524, an input device 526, and a memory 528, which can be interconnected. In some implementations, memory 528 can contain a storage device for storing data received through communications link 408 or through other links. In some implementations, memory 528 can further contain a storage device for storing a server program for controlling processor 522.

Processor 522 can use the computer program to present on display 524 a user input interface and/or the data received through communications link 408, and receive commands and values transmitted by computing device 402 (e.g., a mobile device and/or media device). It should be noted that data received through communications link 408 or any other communications links can be received from any suitable source. Input device 526 can include a computer keyboard, a mouse, a trackball, a keypad, a remote control, any other suitable input device, or any suitable combination thereof.

In some implementations, the client application can include an application program interface (not shown), and/or can be resident in memory 518 of computing device 402 and/or memory 528 of server 410. Additionally or alternatively, a graphical user interface ("GUI") can be distributed to computing device 402, which can allow a user to interact with the client application resident at, for example, server 410.

In some implementations, the client application can include client-side software, hardware, or both. For example, the client application can encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches). As another example, the client application can encompass a computer program that causes a processor to execute the client application. In one particular implementation, the one or more applications can include client-side software, server-side software, hardware, firmware, or any suitable combination thereof. For example, the application(s) can encompass a computer program written in a programming language recognizable by media playback device 502, mobile device 504, and/or server 512 that is executing the application(s) (e.g., a program written in a programming language, such as, Java, C, Objective-C, C++, C#, Javascript, Visual Basic, HTML, XML, ColdFusion, any other suitable approaches, or any suitable combination thereof).

Although the user input interface application is described herein as being implemented on a computing device and/or server, this is only illustrative. The client application can be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for determining channel information are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A system for providing media guidance, the system comprising:
  a media device including a hardware processor that is configured to:
    transmit a request to a plurality of media playback devices connected to a network for device information;
    receive one or more responses to the request, wherein each of the one or more responses includes the device information for one or more of the plurality of media playback devices connected to the network;
    in response to receiving the one or more responses to the request, extract, from the device information included in each of the one or more responses to the request, (i) device details associated with a media playback device and (ii) location information associated with the media playback device;
    determine, without user intervention, an approximate location of the media device based on the location information associated with each of the one or more of the plurality of media playback devices that responded to the request;
    determine, without user intervention, media guidance information based on the approximate location associated with the media device; and
    cause the media guidance information to be presented.

2. The system of claim 1, wherein the hardware processor is further configured to determine whether the network corresponds to a home local area network and wherein the plurality of media playback devices and the media device are connected to the home local area network.

3. The system of claim 1, wherein the device information includes device identification information for one or more of the plurality of media playback devices connected to the network and wherein the device identification information includes device type information and model information associated with each of the plurality of media playback devices.

4. The system of claim 1, wherein the hardware processor is further configured to:
transmit a query that includes at least a portion of the received device information to a remote server that hosts a service provider database that includes service provider information; and
receive the service provider information responsive to the query.

5. The system of claim 4, wherein the media guidance information includes a channel lineup corresponding to the determined service provider information and the determined location information and wherein an electronic program guide that includes a plurality of media content listings organized by a plurality of allocated channel numbers that are derived from the channel lineup.

6. The system of claim 4, wherein the media guidance information includes a media content recommendation that includes a channel number from the determined channel information.

7. The system of claim 1, wherein the hardware processor is further configured to transmit device configuration information to the one or more media devices that includes at least a portion of the determined media guidance information.

8. The system of claim 1, wherein the hardware processor is further configured to select a media playback device from the plurality of media playback devices to present the media guidance information.

9. A method for providing media guidance, the method comprising:
transmitting a request to a plurality of media playback devices connected to a network for device information;
receiving one or more responses to the request, wherein each of the one or more responses includes the device information for one or more of the plurality of media playback devices connected to the network;
in response to receiving the one or more responses to the request, extracting, from the device information included in each of the one or more responses to the request, (i) device details associated with a media playback device and (ii) location information associated with the media playback device;
determining, without user intervention, an approximate location of the media device based on the location information associated with each of the one or more of the plurality of media playback devices that responded to the request;
determining, without user intervention, media guidance information based on the approximate location associated with the media device; and
causing the media guidance information to be presented.

10. The method of claim 9, further comprising determining whether the network corresponds to a home local area network and wherein the plurality of media playback devices and the media device are connected to the home local area network.

11. The method of claim 9, wherein the device information includes device identification information for one or more of the plurality of media playback devices connected to the network and wherein the device identification information includes device type information and model information associated with each of the plurality of media playback devices.

12. The method of claim 9, further comprising:
transmitting a query that includes at least a portion of the received device information to a remote server that hosts a service provider database that includes service provider information; and
receiving the service provider information responsive to the query.

13. The method of claim 12, wherein the media guidance information includes a channel lineup corresponding to the determined service provider information and the determined location information and wherein an electronic program guide that includes a plurality of media content listings organized by a plurality of allocated channel numbers that are derived from the channel lineup.

14. The method of claim 12, wherein the media guidance information includes a media content recommendation that includes a channel number from the determined channel information.

15. The method of claim 9, further comprising transmitting device configuration information to the one or more media devices that includes at least a portion of the determined media guidance information.

16. The method of claim 9, further comprising selecting a media playback device from the plurality of media playback devices to present the media guidance information.

17. A non-transitory computer-readable medium containing computer-executable instructions that, when executed by a processor, cause the processor to perform a method for providing media guidance, the method comprising:
transmitting a request to a plurality of media playback devices connected to a network for device information;
receiving one or more responses to the request, wherein each of the one or more responses includes the device information for one or more of the plurality of media playback devices connected to the network;
in response to receiving the one or more responses to the request, extracting, from the device information included in each of the one or more responses to the request, (i) device details associated with a media playback device and (ii) location information associated with the media playback device;
determining, without user intervention, an approximate location of the media device based on the location information associated with each of the one or more of the plurality of media playback devices that responded to the request;
determining, without user intervention, media guidance information based on the approximate location associated with the media device; and
causing the media guidance information to be presented.

18. The non-transitory computer-readable medium of claim 17, wherein the method further comprises determining whether the network corresponds to a home local area network and wherein the plurality of media playback devices and the media device are connected to the home local area network.

19. The non-transitory computer-readable medium of claim 17, wherein the device information includes device identification information for one or more of the plurality of media playback devices connected to the network and wherein the device identification information includes device type information and model information associated with each of the plurality of media playback devices.

20. The non-transitory computer-readable medium of claim 17, wherein the method further comprises:
- transmitting a query that includes at least a portion of the received device information to a remote server that hosts a service provider database that includes service provider information; and
- receiving the service provider information responsive to the query.

21. The non-transitory computer-readable medium of claim 20, wherein the media guidance information includes a channel lineup corresponding to the determined service provider information and the determined location information and wherein an electronic program guide that includes a plurality of media content listings organized by a plurality of allocated channel numbers that are derived from the channel lineup.

22. The non-transitory computer-readable medium of claim 20, wherein the media guidance information includes a media content recommendation that includes a channel number from the determined channel information.

23. The non-transitory computer-readable medium of claim 17, wherein the method further comprises transmitting device configuration information to the one or more media devices that includes at least a portion of the determined media guidance information.

24. The non-transitory computer-readable medium of claim 17, wherein the method further comprises selecting a media playback device from the plurality of media playback devices to present the media guidance information.

* * * * *